(12) United States Patent
Noda et al.

(10) Patent No.: US 6,671,759 B1
(45) Date of Patent: Dec. 30, 2003

(54) APPARATUS AND METHOD FOR MAPPING IEEE 1394 NODE IDS TO UNCHANGING NODE UNIQUE IDS TO MAINTAIN CONTINUITY ACROSS BUS RESETS

(75) Inventors: Takuro Noda, Tokyo (JP); Yukihiko Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 373 days.

(21) Appl. No.: 09/595,210

(22) Filed: Jun. 16, 2000

(30) Foreign Application Priority Data

Jun. 18, 1999 (JP) .......................... P11-171798

(51) Int. Cl.⁷ ........................ G06F 13/00; G06F 15/177
(52) U.S. Cl. ............................ 710/104; 710/10; 713/1; 713/100
(58) Field of Search .............................. 710/104, 8–19, 710/100, 300–304; 713/1, 2, 100

(56) References Cited

U.S. PATENT DOCUMENTS

| 5,764,930 A | * | 6/1998 | Staats ........................ 710/107 |
| 5,825,752 A | * | 10/1998 | Fujimori et al. ............ 370/260 |
| 5,978,854 A | * | 11/1999 | Fujimori et al. ............ 709/245 |
| 6,160,796 A | * | 12/2000 | Zou ........................... 370/257 |
| 6,219,697 B1 | * | 4/2001 | Lawande et al. ........... 709/221 |
| 6,332,159 B1 | * | 12/2001 | Hatae et al. ................ 709/224 |
| 6,333,739 B1 | * | 12/2001 | Koyama et al. ............ 345/744 |
| 6,366,964 B1 | * | 4/2002 | Shima et al. .................. 710/8 |
| 6,389,466 B1 | * | 5/2002 | Zondag ....................... 709/221 |

* cited by examiner

*Primary Examiner*—Sumati Lefkowitz
(74) *Attorney, Agent, or Firm*—Jay H. Maioli

(57) ABSTRACT

An electronic device is connected to a plurality of other electronic devices through an IEEE 1394 bus, and performs data communication with the other electronic devices through the bus. The electronic device includes a storage portion, an interface portion, and a control portion. The interface portion is connected to the bus. The control portion controls the storage portion and the interface portion. The control portion controls the interface portion to obtain identification codes of each of the plurality of other electronic devices connected through the bus, further controls the interface portion to obtain intrinsic information from a communication partner electronic device from among the plurality of other electronic devices connected through the bus, and causes the obtained intrinsic information to correspond to the identification code and to be stored in the storage portion, and when the identification code of the communication partner electronic device is changed, the intrinsic information of the communication partner electronic device stored in the storage portion is renewed on the basis of the changed identification code.

6 Claims, 17 Drawing Sheets

ISOCHRONOUS PACKET

DATA FIELD

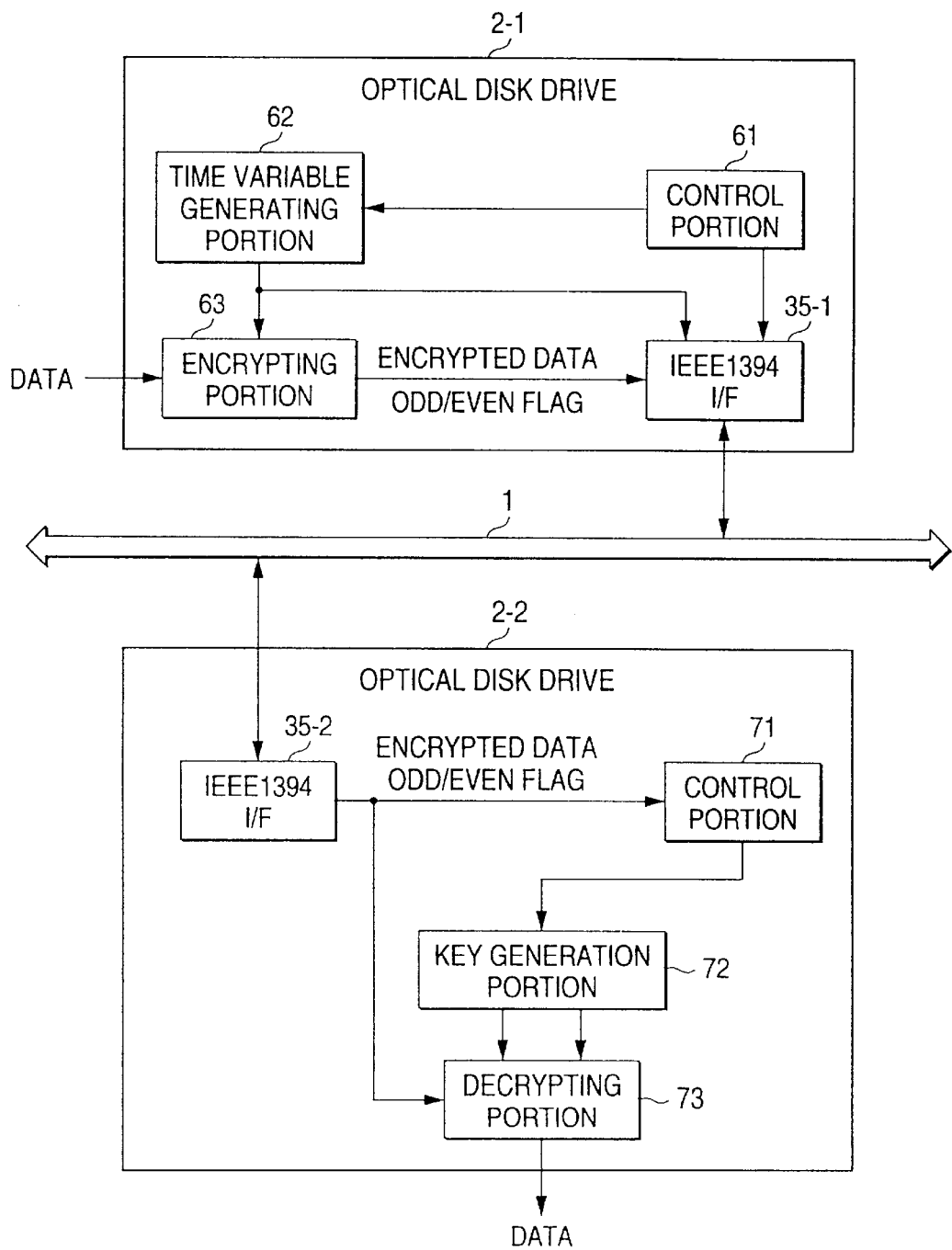

APPARATUS AND METHOD FOR MAPPING IEEE 1394 NODE IDS TO UNCHANGING NODE UNIQUE IDS TO MAINTAIN CONTINUITY ACROSS BUS RESETS

BACKGROUND

1. Field of the Invention

The present invention relates to an electronic device, a data communication method of an electronic device, and a data communication method. Particularly, the present invention relates to an electronic device, a data communication method of an electronic device, and a data communication method, in which data communication is performed through a bus.

2. Background of the Invention

Recently, electronic devices capable of mutually communicating data through an IEEE 1394 bus, for example, a personal computer or a digital video camera, have been developed, and in future, it appears that the kinds of such electronic devices increase.

In the case where data communication is performed by such electronic devices equipped with IEEE 1394 interfaces, for example, in the case where video data taken by a digital video camera are transmitted to a personal computer through an IEEE 1394 bus, one of the electronic devices specifies the other electronic device as a communication partner by using a node ID given to each.

However, the node ID is dynamically given to the electronic device, and it is renewed, for example, every time bus reset occurs. Thus, there has been a problem in the case where the bus reset occurs during data communication, since the node ID of the electronic device as the communication partner is changed from the one before the bus reset, the process of setting the communication partner must be again carried out in order to continue the data communication.

SUMMARY OF THE INVENTION

It is therefore an object of the present invention to provide an electronic device which resolves the above-mentioned problem.

It is another object of the present invention to provide a data communication method of an electronic device which resolves the above-mentioned problem.

It is a further object of the present invention to provide a data communication method which resolves the above-mentioned problem.

According to the present invention, there is provided an electronic device. The electronic device is connected to a plurality of other electronic devices through a bus, and performs data communication with the other electronic devices through the bus. The electronic device includes a storage portion, an interface portion, and a control portion. The interface portion is connected to the bus. The control portion controls the storage portion and the interface portion. The control portion controls the interface portion to obtain identification codes of the plurality of other electronic devices connected through the bus, further controls the interface portion to obtain intrinsic information from the other electronic device as a communication partner among the plurality of other electronic devices connected through the bus, and causes the obtained intrinsic information to correspond to the identification code and to be stored in the storage portion, and when the identification code of at least the electronic device as the communication partner is changed, the intrinsic information of the electronic device as the communication partner stored in the storage portion is renewed on the basis of the changed identification code.

According to the present invention, there is provided a data communication method of an electronic device. The electronic device is connected to a plurality of other electronic devices through a bus, and performs data communication with the plurality of other electronic devices through the bus. The method includes steps of obtaining identification codes of the plurality of other electronic devices connected through the bus, obtaining intrinsic information from the other electronic device as a communication partner among the plurality of other electronic devices connected through the bus, causing the obtained intrinsic information to correspond to the identification code and to be stored, and renewing, when the identification code of at least the electronic device as the communication partner is changed, the stored intrinsic information of the electronic device as the communication partner on the basis of the changed identification code.

According to the present invention, there is provided a data communication method. The method includes steps of connecting a plurality of electronic devices through a bus, and performing data communication among the plurality of electronic devices through the bus. The method is such that a certain electronic device of the plurality of electronic devices obtains identification codes of the remaining electronic devices among the plurality of electronic devices connected through the bus, the certain electronic device obtains intrinsic information from the other electronic device as a communication partner among the plurality of other electronic devices connected through the bus, the certain electronic device causes the obtained intrinsic information to correspond to the identification code and to be stored, and when the identification code of at least the electronic device as the communication partner is changed, the certain electronic device renews the stored intrinsic information of the electronic device as the communication partner on the basis of the changed identification code.

BRIEF DESCRIPTION OF THE DRAWINGS

FIG. 12 is a block diagram showing a structural example of a portion relative to encryption and decryption of an isochronous packet of an optical disk drive 2.

DESCRIPTION OF THE INVENTION

Figure 1:
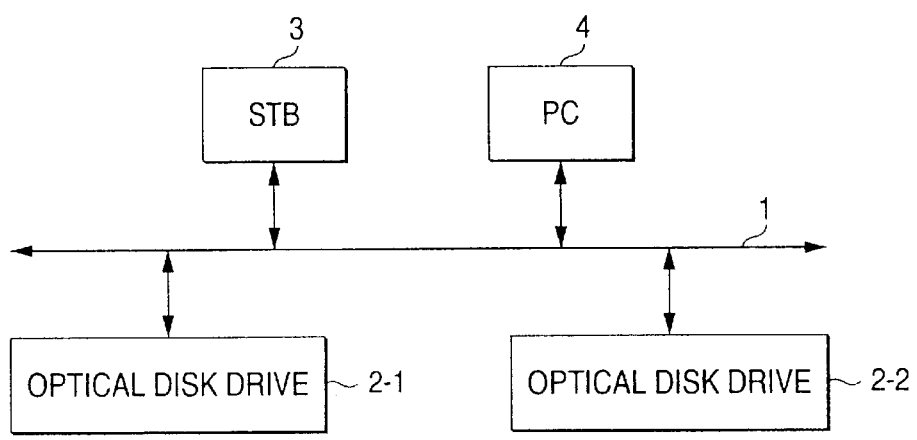
FIG. 1 is a block diagram showing a structural example of a bus network system constructed by electronic devices to which the present invention is applied.

FIG. 1 shows a bus network system constituted by optical disk recording and/or reproducing devices 2-1 and 2-2 (hereinafter, simply referred to as optical disk drives 2-1 and 2-2, and in the case where it is not necessary to respectively discriminate between the disk drives, each is simply referred to as an optical disk drive 2), a set top box (STB) 3, and a personal computer (PC) 4. The devices including the optical disk drive 2 and the personal computer 4 are respectively provided with an IEEE 1394 interface for connection with an IEEE 1394 serial bus 1, and it is possible to mutually communicate content data (audio data, video data, program data, etc.) through the IEEE 1394 bus 1. The devices including the optical disk drive 2 and the personal computer 4 respectively transmit control signals through the IEEE 1394 bus 1, so that one electronic device can control the operation of the other electronic device on the bus network.

Figure 2:
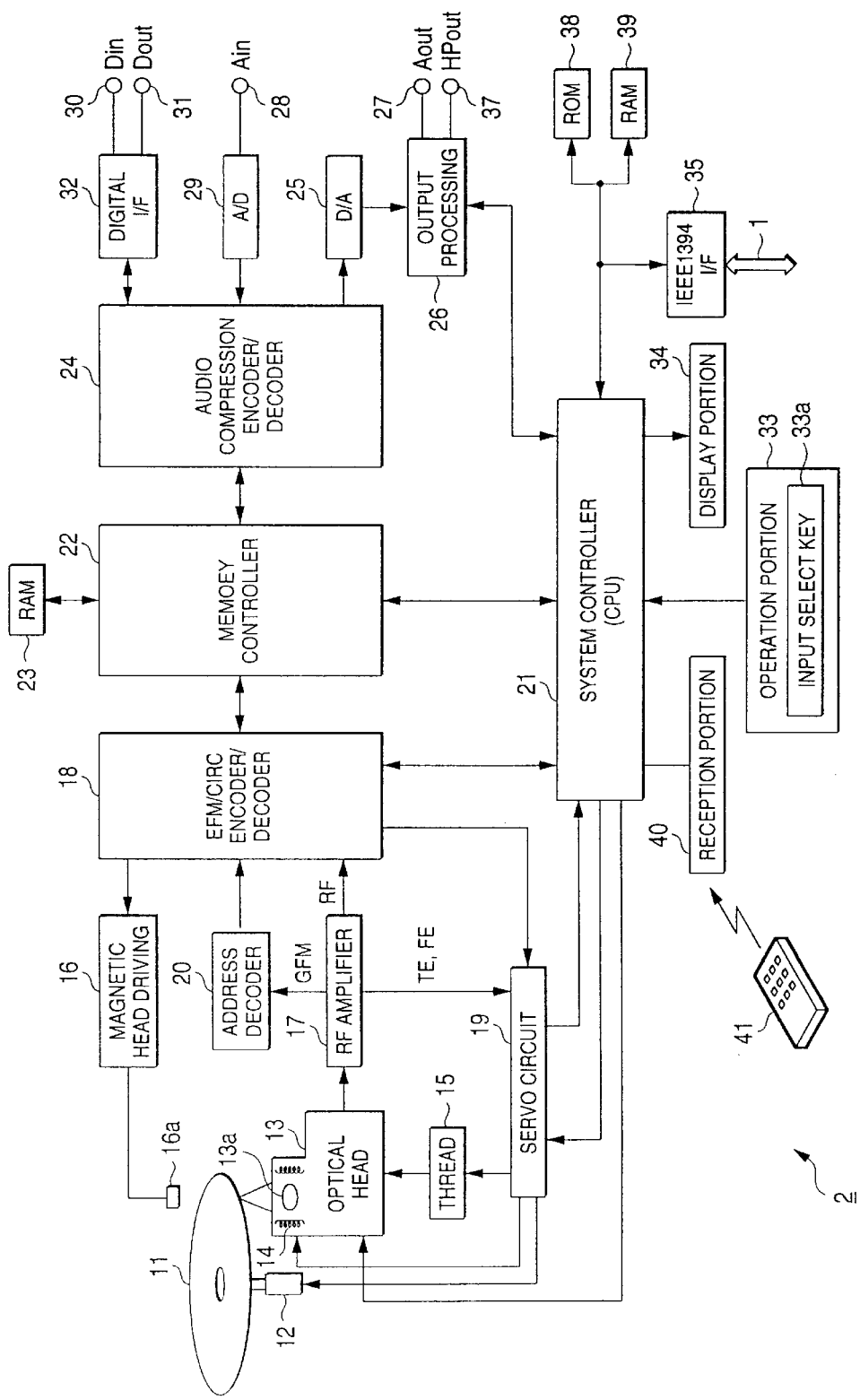
FIG. 2 is a block diagram showing a structural example of an optical disk drive to which the present invention is applied.

Incidentally, the present invention relates to the IEEE 1394 interface provided in each of the devices including the optical disk drive 2 and the personal computer 4, and a description will be mainly made, as an example, on an IEEE 1394 interface 35 provided in the optical disk drive 2 shown in FIG. 2. Since an IEEE 1394 interface provided in the set top box 3 or the personal computer 4 is the same as the IEEE 1394 interface 35, its description is omitted.

The optical disk 2 of the present invention will be described with reference to FIG. 2. In the optical disk drive 2, a magneto-optical disk (hereinafter simply referred to as a disk) 11 on which audio data can be recorded is rotated by a spindle motor 12 at, for example, a constant linear speed. The disk 11 is irradiated with a laser beam from an optical head 13 at the time of recording and the time of reproduction. The optical head 13 is constituted by a laser diode, a polarization beam splitter, an objective lens 13a, a detector, and the like. The objective lens 13a is supported in such a manner that it can be moved by an actuator 14 in the radius direction of the disk the, so-called tracking direction and in the direction toward the disk the, so-called focusing direction. The optical head 13 irradiates, at the time of recording, a laser beam of a high output level to the disk 11 so as to heat a recording track of the disk 11 to the Curie temperature, and irradiates, at the time of reproduction, a laser beam of an output level, which is lower than the output level at the time of recording, to the disk 11 so as to detect data from reflected light through a magnetic Kerr effect.

A magnetic head 16a disposed at a position opposite to the optical head 13 through the disk 11 applies a modulated vertical magnetic field to the disk 11 on the basis of supplied recording data. The optical head 13 and the magnetic head 16a are moved by a thread mechanism 15 in the radius direction of the disk 11.

At the time of reproduction, an output signal from the optical head 13 which detects the reflected beam of the laser beam irradiated to the disk 11 is supplied to a RF amplifier 17. The RF amplifier 17 performs a predetermined arithmetic operation to the supplied output signal from the optical head 13 and obtains a reproduction RF signal, a tracking error signal TE, a focus error signal FE, a groove information GFM (absolute position information or the like recorded as a pre-groove (wobbling groove) on the disk 11), and the like. The reproduction RF signal is supplied to an encoder/decoder 18. The tracking error signal TE and the focus error signal FE are supplied to a servo circuit 19, and the groove information GFM is supplied to an address decoder 20.

The servo circuit 19 generates various servo driving signals through the tracking error signal TE and the focus error signal FE supplied from the RF amplifier 17, a track jump instruction and an access instruction inputted from a system controller 21, rotation speed detection information of the spindle motor 12, and the like, controls the actuator 14 to perform focusing and tracking control, controls the thread mechanism 15 to perform the feeding operation of the optical head 13 and the magnetic head 16a, and controls the spindle motor 12 to rotate at a constant linear speed.

The address decoder 20 decodes the groove information GFM supplied from the RF amplifier 17 and extracts address information. The address information extracted by the address decoder 20 is supplied to the system controller 21, and is used for various control operations. The reproduction RF signal outputted from the RF amplifier 17 is supplied to the EFM/CIRC encoder/decoder 18, and is subjected to the decode processing such as EFM demodulation or CIRC in the encoder/decoder 18. At this time, an address, sub-code data and the like are also extracted, and the extracted address, sub-code data and the like are also supplied to the system controller 11.

The audio data subjected to the decode processing such as EFM demodulation or CIRC in the EFM/CIRC encoder/decoder 18 is once written in a buffer memory (RAM) 23 by a memory controller 22.

The readout of data recorded on the disk 11 by the optical head 13, and the transfer of reproduced data in a signal processing system from the optical head 13 to the buffer memory 23 are respectively 1.41 Mbit/sec, and the transfer of reproduced data is normally intermittently performed.

The data once written in the buffer memory 23 are read out from the memory 23 at the timing when the transfer of reproduced data becomes 0.3 Mbit/sec, and are supplied to an audio compression encoder/decoder 24. The data read out from the memory 13 are subjected to a signal reproduction processing such as an expansion processing against the audio compression processing, and are converted into a digital audio signal of 44.1 KHz sampling and 16 bit quantization. This digital audio signal is converted into an analog audio signal by a D/A converter 25, is subject to level adjustment, impedance adjustment or the like in an output processing portion 26, and is outputted, as an analog audio signal Aout, to an external device from a line output terminal 27. The analog audio signal from the D/A converter 25 is supplied, as a headphone output HPout, to a headphone output terminal 37, and is outputted to a headphone connected to the headphone terminal 37.

The digital audio signal in the state where it is decoded by the audio compression encoder/decoder 24 can also be outputted, as a digital audio signal Dout, to an external device from a digital output terminal 31 through a digital interface (I/F) 32. For example, the signal is outputted to the external device in a transmission form with an optical cable through the digital output terminal 31.

Incidentally, although standards which are applied to the digital interface 32 are not particularly limited, here, it is assumed that IEC (International Electrotechnical Commission) 958 as one of standards of digital audio interfaces is adopted.

At the time of recording, a recording signal (analog audio signal Ain) supplied to a line input terminal 28 is converted into a digital audio signal by an A/D converter 29, and then, it is supplied to the encoder/decoder 24, and is subjected to an audio compression encode processing on the basis of a method such as modified DCT (Modified Discrete Cosine Transform). In the case where a digital audio signal Din is supplied from an external device to a digital input terminal 30, after extraction of a control code or the like is performed in the digital interface 32, it is supplied to the encoder/decoder 24 and is subjected to the audio compression encode processing. Although not shown, also in the case where a microphone input terminal is provided and a microphone input is used as a recording signal, it can be recorded on the disk 11 by performing the processing as the processing of the analog audio signal supplied to the line input terminal 28.

The digital data compressed by the encoder/decoder 24 are once written in the buffer memory 23 by the control of the memory controller 22, and are stored in the memory 23, and then, the data are read out from the memory 23 in every unit of a predetermined amount of data, and are supplied to the EFM/CIRC encoder/decoder 18. The data read out from the memory 23 are supplied to the encoder/decoder 18, and after the encode processing such as CIRC encoding or EFM modulation is performed, the data are supplied to the magnetic head driving circuit 16.

The magnetic head driving circuit 16 supplies a magnetic head drive signal to the magnetic head 16a on the basis of the recording data which were subjected to the encode processing. That is, the vertical magnetic field of N pole or S pole by the magnetic head 16a is applied to the disk 11. At this time, the system controller 21 supplies a control signal to the optical head 13 to output a laser beam of an output level required for recording.

An operation portion 33 indicates a portion used for a user's operation, and various operation keys and handlers as dials are provided. As the handlers, there are provided, for example, keys for giving instructions of recording and reproducing operations, such as reproduction, recording, temporal stop, stop, FF (fast-forwarding), REW (rewinding), and AMS (head search), plural keys relative to reproduction modes, such as normal reproduction, program reproduction, and random reproduction, a key for display mode operation of switching a display state at a display portion 34, and plural keys for program editing operations, such as track (program) division, track coupling, track erasure, track name input, and disk name input. The operation information by these operation keys and the dial is supplied to the system controller 21. A reception portion 40 receives a command signal transmitted from a remote controller 41 by, for example, infrared rays, and outputs a command code (operation information) corresponding to the command signal to the system controller 21. In response to the operation information inputted from the operation portion 33 or the reception portion 40, the system controller 21 controls the whole of the optical disk drive 2.

The display portion 34 drives a liquid crystal panel or the like in accordance with the control by the system controller 21, and displays the display data (figure, character, symbol or the like indicating the operation mode state of a recording/reproducing disk, track number, recording time/reproduction time, editing operation state, and the like) supplied from the system controller 21. The display portion 34 displays character information (track name, etc.) recorded on the disk 11 as an incidental to a program as main data. Further, on the basis of control from the system controller 21, the display portion 34 displays copyright information of content data inputted to the optical disk drive 2 from another electronic device, such as the set top box 3, through the IEEE 1394 serial bus 1.

An IEEE 1394 interface (I/F) 35 allows communication of content data with another electronic device through the IEEE 1394 bus 1. The detailed description of the IEEE 1394 interface 35 will be made later.

The system controller 21 is constructed by a microcomputer made of a CPU, an internal interface portion, and the like, and reads and executes programs for realizing various operations stored in a program ROM 38, so that the whole of the optical disk drive 2 is controlled. Data, programs and the like required for the system controller 21 to perform various processings are suitably written in a work RAM 39.

Next, an authentication processing performed as a preprocessing when data are communicated between the electronic devices constituting the bus network through the IEEE 1394 bus 1 will be described with reference to FIGS. 3A and 3B.

For example, when the set top box 3 distributes audio data as an isochronous packet to the IEEE 1394 bus 1, and when the optical disk drive 2 attempts to receive the isochronous packet of the audio data, this authentication processing is started before the reception of the isochronous packet is started.

In the optical disk drive 2 as a reception side, the system controller 21 controls the IEEE 1394 interface 35 on the basis of a program for authentication stored in the program ROM 38, so that this authentication processing is realized. In the set top box 3 as a transmission side, similarly to the optical disk drive 2, a not-shown built-in IEEE 1394 interface of the set top box 23 is controlled by a controller of the set box 23, so that the authentication processing is realized.

At step S1, the IEEE 1394 interface 35 of the optical disk drive 2 transmits an authentication request to the set top box 3 through the IEEE 1394 bus 1. The authentication request from the IEEE 1394 interface 35 is received by the IEEE 1394 interface of the set top box 3 at step S11.

At step S2, the IEEE 1394 interface 35 of the optical disk drive 2 transmits its own authentication information to the set top box 3 through the IEEE 1394 bus 1. This authentication information is received by the IEEE 1394 interface of the set top box 3 at step S12.

Next, similarly, at step S13, the IEEE 1394 interface of the set top box 3 transmits its own authentication information to the optical disk drive 2 through the IEEE 1394 bus 1. This authentication information is received by the IEEE 1394 interface 35 of the optical disk drive 2 at step S3.

Thereafter, in the IEEE 1394 interface of the set top box 3, at step S14, a common key used when an isochronous packet of audio data is encrypted is prepared. On the other hand, also in the IEEE 1394 interface 35 of the optical disk drive 2, at step S4, a common key used when an encrypted isochronous packet is decrypted is prepared. After the authentication processing is ended in this way, the reception of the isochronous packet of the audio data is actually started in the optical disk drive 2.

Incidentally, several seconds to several tens of seconds are required from the start of the authentication processing to the end. Before the authentication processing is ended, that is, in the middle of execution of the authentication processing, for example, in the case where the user of the optical disk drive 2 gives an instruction to stop the reception of audio data as content data from the set top box 3, if the authentication processing under execution is not immediately stopped, it becomes impossible for the optical disk drive 2 and the set top box 3 to execute a processing corresponding to a newly inputted instruction for several seconds to several tens of seconds.

Figure 4:
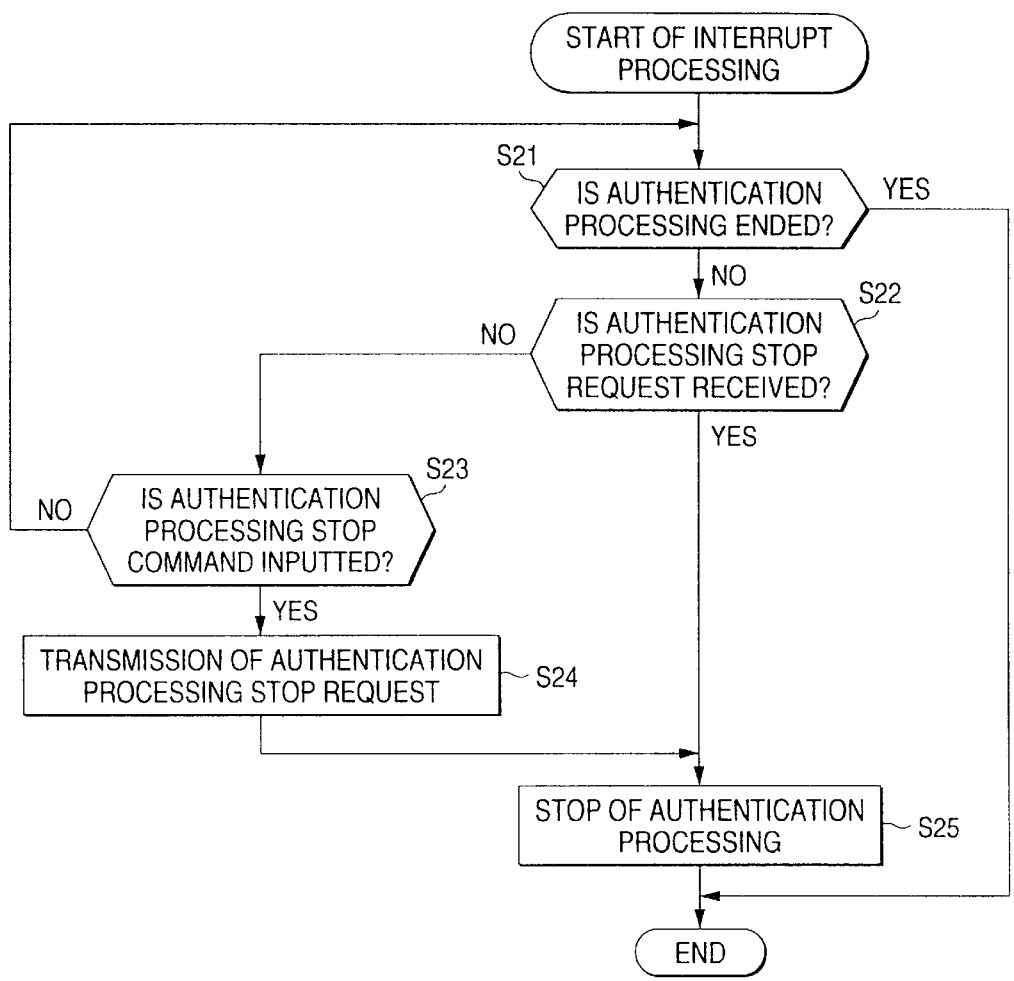
FIG. 4 is a flowchart for explaining an interrupt processing.

Then, in the present invention, in order to solve such disadvantage, an interrupt processing is executed in parallel with the foregoing authentication processing in the IEEE 1394 interface of the optical disk drive 2 and the set top box 3. The interrupt processing will be described with reference to the flowchart of FIG. 4.

Incidentally, although the operation of the IEEE 1394 interface 35 of the optical disk drive 2 is described in the following, it is assumed that the IEEE 1394 interface of the set top box 3 executes the same operation.

At step S21, the IEEE 1394 interface 35 of the optical disk drive 2 judges whether or not the authentication processing is ended, and in the case where it is judged that the authentication processing is not ended, the process proceeds to step S22. At step S22, the IEEE 1394 interface 35 judges whether or not an authentication processing stop request from an authentication partner (in this case, the IEEE 1394 interface of the set top box 3) is received, and in the case where it is judged that the authentication processing stop request is not received, the process proceeds to step S23. At step S23, the IEEE 1394 interface 35 judges whether or not a command or the like to stop the authentication processing is inputted from the user, and in the case where it is judged that the command or the like to stop the authentication processing is inputted, the process proceeds to step S24. At step S24, the IEEE 1394 interface 35 transmits the authentication processing stop request to the IEEE 1394 interface of the set top box 3 as the authentication partner.

At step S25, the IEEE 1394 interface 35 immediately stops the authentication processing.

Incidentally, at step S21, in the case where it is judged that the authentication processing is ended, this interrupt processing is also ended.

At step S22, in the case where it is judged that the authentication processing stop request is received, the process proceeds to step S25 and the authentication processing is immediately stopped.

At step S23, in the case where it is judged that the command or the like to stop the authentication processing is not inputted, the process returns to step S21, and the subsequent processing is repeated.

Incidentally, the input of the command or the like to stop the authentication processing at step S23 means that in the optical disk drive 2, a reproduction stop button, a recording stop button, an eject button, a power supply button, or the like provided at the operation portion 33 of the optical disk drive 2 is pressed down.

As described above, by executing the interrupt processing in parallel with the authentication processing, when there occurs a case where the authentication processing is made unnecessary, the authentication processing is immediately stopped. Thus, it becomes possible to process a newly inputted command or the like without waiting for the normal end of the authentication processing.

Next, in the bus network system shown in FIG. 1, a recovery processing executed when bus reset occurs will be described. The respective electronic devices constituting the bus network system identify other electronic devices by using a node ID dynamically given to each. Thus, in the case where the bus reset (a node ID given to each electronic device is once reset and a new ID is again given to each electronic device) occurs in the middle of data communication between the electronic devices on the bus network by, for example, connection of a new additional electronic device to the bus network system, the node ID of the communication partner is changed, which is disadvantageous.

Figure 5:
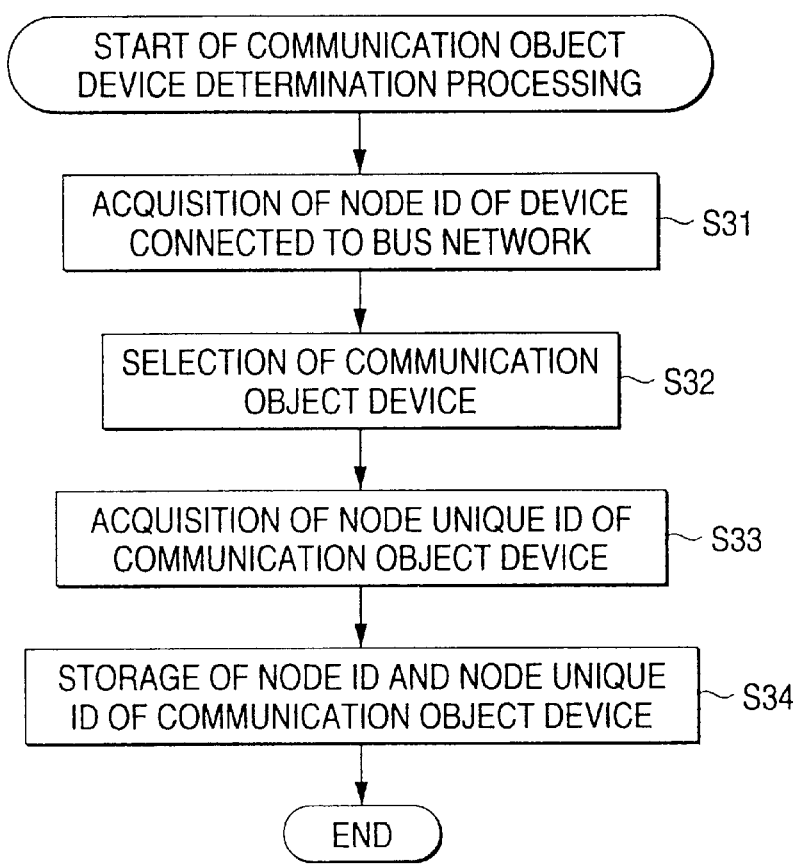
FIG. 5 is a flowchart for explaining a communication object device determining processing.
Figure 6:
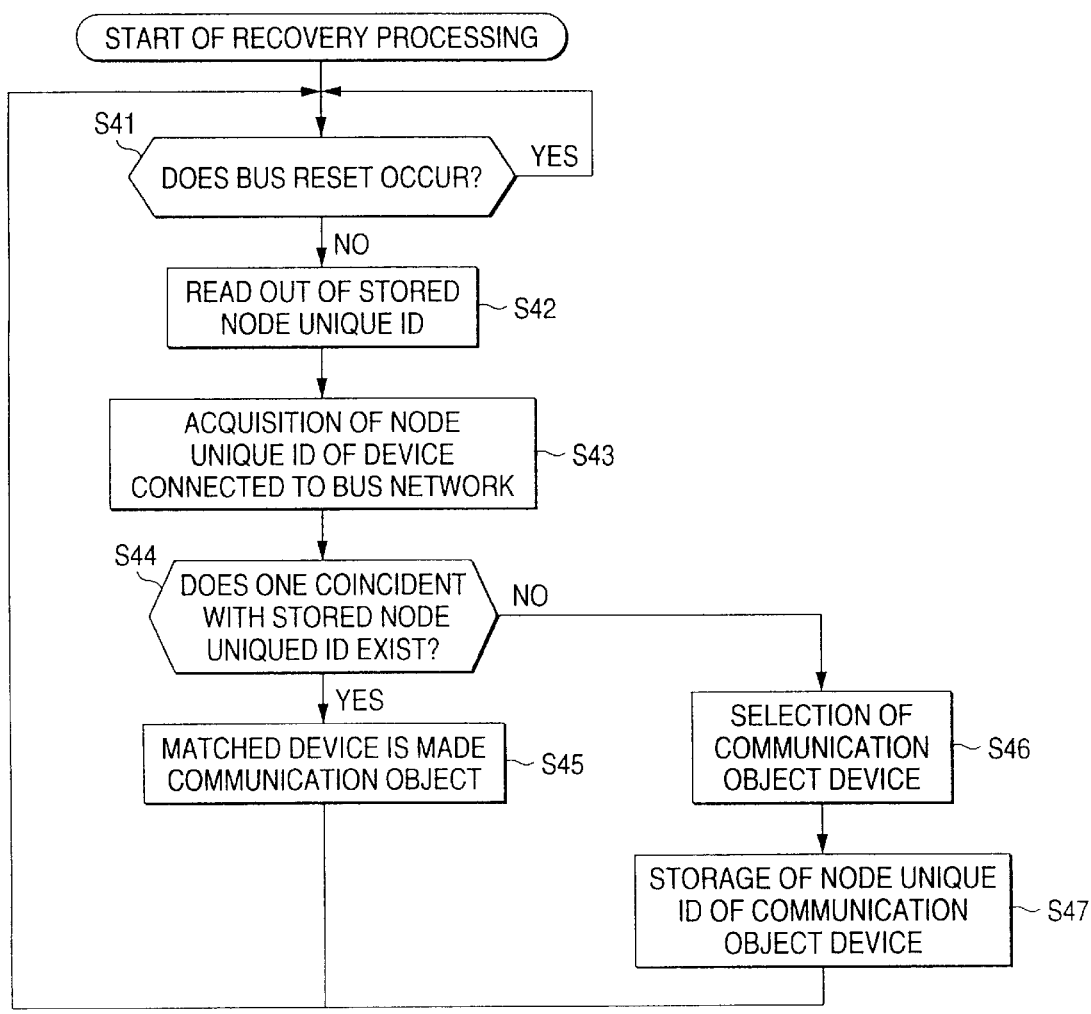
FIG. 6 is a flowchart for explaining a recovering processing.

Then, in the present invention, a communication partner is determined by a communication object device determination processing shown in FIG. 5, and then, a recovery processing shown in FIG. 6 is executed during data communication. Thus, even if a node ID is changed by the occurrence of the bus reset, a trouble does not occur in the data communication under execution.

Incidentally, for example, in the optical disk drive 2, the communication object device determination processing and the recovery processing are realized mainly in such a way that the system controller 21 controls the IEEE 1394 interface 35 on the basis of a program for communication object device determination processing or a program for recovery processing stored in the program ROM 38.

At step S31, the IEEE 1394 interface 35 obtains node IDs of all electronic devices connected to the IEEE 1394 bus 1. At step S32, when the user of the optical disk drive 2 selects an electronic device as a communication partner (hereinafter referred to as a communication object device) by, for example, operating the operation portion 33, at step S33, the IEEE 1394 interface 35 obtains intrinsic information capable of specifying the communication object device, such as a node unique ID (hereinafter referred to as intrinsic information), from the communication object device selected at step S32. At step S34, the IEEE 1394 interface 35 makes the node ID correspond to the intrinsic information of the communication object device and stores the intrinsic information, together with the node ID, in a predetermined storage medium, for example, the work RAM 39. Since the node ID and the intrinsic information like the node unique ID have only to be correspondent to each other and to be stored, it is not necessarily required that the node ID and the node unique ID are made correspondent to each other and are stored in the work RAM 39.

Like this, the communication object device is determined, and after the node ID is made correspondent to the intrinsic information of the determined communication object device and is stored, data communication is started while the node ID is used as information to specify the communication destination, and the recovery processing shown in FIG. 6 is executed in parallel with that.

At step S41, the IEEE 1394 interface 35 judges whether or not the bus reset occurs, and waits until it judges that the bus reset occurs. In the case where it judges that the bus reset occurs, the process proceeds to step S42. At step S42, the IEEE 1394 interface 35 reads out the intrinsic information (for example, the node unique ID) stored at step S34 of the communication object device determination processing. At step S43, the IEEE 1394 interface 35 obtains the intrinsic information of the respective electronic devices connected to the IEEE 1394 bus 1.

At step S44, the IEEE 1394 interface 35 judges whether or not the intrinsic information of the respective electronic devices obtained at step S43 includes what is coincident with the intrinsic information read out at step S42 (whether or not there exists an electronic device which was a communication partner until the time just before the bus reset), and in the case where it is judged that there exists what is coincident therewith, the process proceeds to step S45.

At step S45, by the IEEE 1394 interface 35, an electronic device having intrinsic information coincident with intrinsic information stored subsequently to the state prior to the bus reset is made a communication partner, its node ID is obtained, and the data communication is reopened. Thereafter, the process returns to step S41, and the subsequent processing is repeated.

Incidentally, at step S44, in the case where it is judged that the intrinsic information of the respective electronic devices obtained at step S43 does not include what is coincident with the intrinsic information read out at step S42, that is, there does not exist an electronic device which was a communication partner until the time just before the bus reset, the process proceeds to step S46. At step S46, the IEEE 1394 interface 35 notifies the system controller 21 that there does not exist an electronic device which was a communication partner until the time just before the bus reset. In response to this notification, the system controller 21 causes the display portion 35 to show an indication to urge the user to select a new communication object device and notifies the user. In response to this urging, the user selects a new communication object device by, for example, operating the operation portion 33.

At step S47, the IEEE 1394 interface 35 obtains the intrinsic information and node ID of the communication object device newly selected at step S46, stores them in the work RAM 39 or the like, and starts communication of data by using the node ID.

If the recovery processing is made to be executed at the time when the power supply of the electronic device is turned on, that is, at the time when the electronic device is started, without executing the communication object determination processing of FIG. 5, the electronic device which was a communication partner when the power supply of the electronic device was last turned off can be automatically made a communication object device. Incidentally, in order to cause the recovery processing to be executed at the time of starting, it is necessary that the medium, for example, the work RAM 39 for recording the intrinsic information remains holding the intrinsic information even in the period when the power supply of the electronic device is turned off.

Further, if various parameters relative to the communication object device, together with the intrinsic information of the communication partner, are stored in the medium for recording the intrinsic information, for example, the work RAM 39, it becomes possible to shorten a time taken until communication of data is actually started, by using the information relative to the stored various parameters after the but reset or after the starting of the electronic device.

Next, a description will be made on a function (hereinafter referred to as a copyright information notification function) to notify the user of established copyright information (information indicating permission/non-permission to copy, or the like) for content data such as audio data received through the IEEE 1394 bus 1 owned by the devices including the optical disk drive 2 and the personal computer 4 of the embodiment. Here, the copyright information written in the isochronous packet of content data such as audio data will be described.

Figure 7:
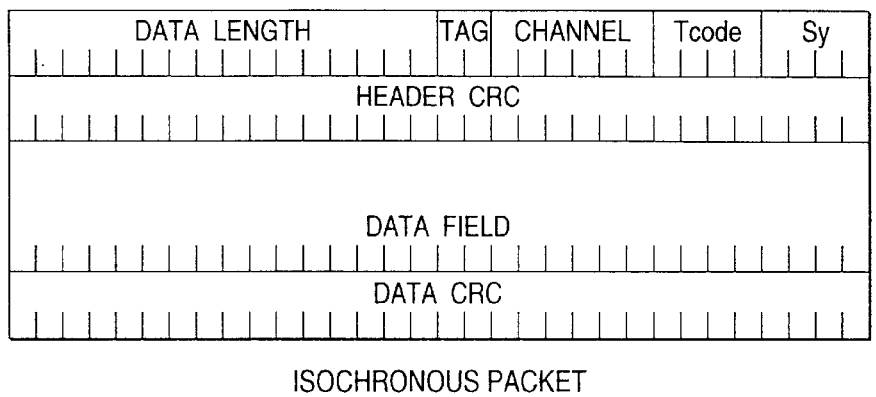
FIG. 7 is a view showing a data structure of an isochronous packet.

FIG. 7 shows a data structure of an isochronous packet of audio data communicated on the IEEE 1394 bus 1. One quadlet (32 bits) at the MSB side of the packet is a packet header, and is constituted by a data length (Data Length), tag (Tag), channel (Channel), transaction code (Tcode), and synchronization code (Sy).

The number of bytes transmitted as the isochronous packet is written in the data length. A label relative to the format of the isochronous packet is set up in the tag. The kind of the packet and the code of transaction are written in the transaction code. Information intrinsic to an application is written in the synchronization code.

A code for error detection (header CRC) of the packet header is written in one quadlet subsequent to the packet header. Subsequently to this, a data field (Data Field) of a main body of audio data or the like and a code for error detection (Data CRC) of audio data or the like are written.

As the copyright information concerning the content information such as audio data, copyright management information (EMI (Encryption Mode Information)) is written in the synchronization code of the packet header, and SCMS (Serial Copy Management System) information is written in the data field.

Figure 8A:
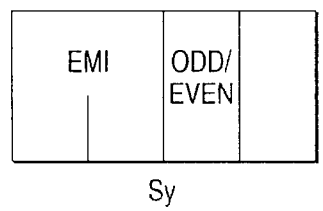
FIGS. 8A and 8B are views for explaining a position where copyright information is written.

Specifically, with respect to the synchronization code, as shown in FIG. 8A, copyright management information indicating one of four kinds of states (Copy Free, Write Once, No More Copy, Never Copy) relative to the permission/non-permission of copying is written in 2 bits at the MSB side.

"Copy Free" as one of the four kinds of states concerning the permission/non-permission of copying indicates that copying is permitted for the content data without limiting the number of times of copying. "Write Once" indicates that copying is permitted for the content at only one generation (one time). "No More Copy" indicates that the content data is the first copy of content data of "Write Once" and copying is not permitted for the content. "Never Copy" indicates that copying is not permitted for the content.

In one bit subsequent to the copyright management information, in the case where the content data were encrypted at the transmission side, an ODD/EVEN flag indicating the attribute of an encryption key used for the encryption is written (the details will be described later).

Figure 8B:
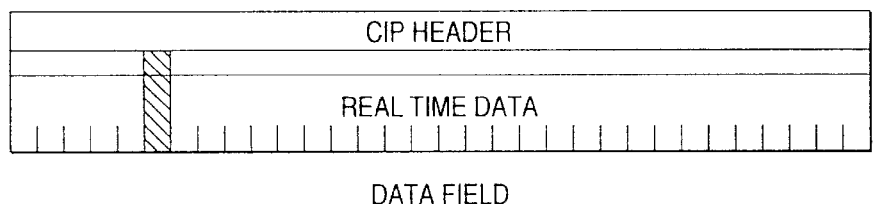

As to the data field, as shown in FIG. 8B, 192 bits, each being a sixth bit from the MSB side of every quadlet of real time data subsequent to a CIP (Common Isochronous) header of one quadlet constituting the data field, are arranged, and a flag (SCMS information) indicating permission/non-permission of copying is written in a third bit from the head. In the case where 1 is written in this flag, it indicates that copying is permitted for the content data, and in the case where 0 is written in the flag, it indicates that copying is inhibited for the content data.

Figure 9:
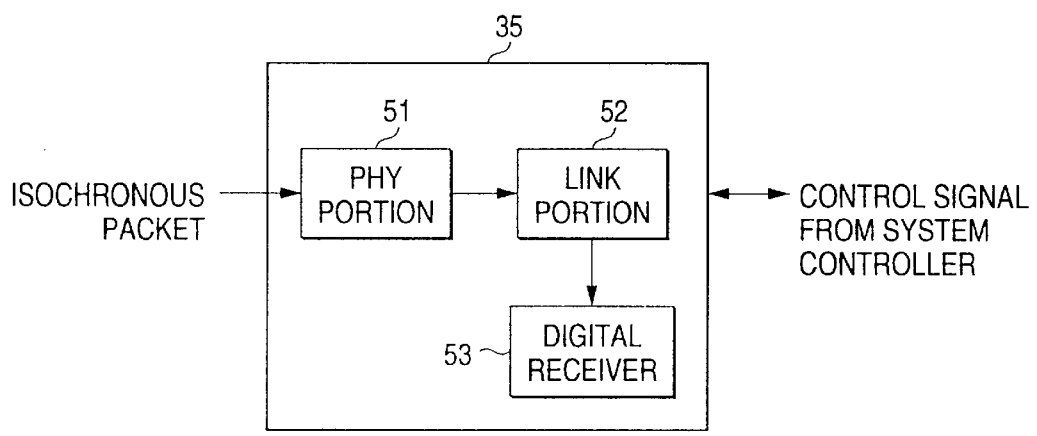
FIG. 9 is a block diagram showing a structural example of a part relative to a copyright information display processing of an IEEE 1394 interface 35.

FIG. 9 shows a structural example of a part relative to the copyright information notification function of the IEEE 1394 interface 35 of the optical disk drive 2. In the example shown in FIG. 9, a physical layer (PHY) portion 51 receives an isochronous packet from the IEEE 1394 bus 1 and supplies it to a link (Link) portion 52. The link layer portion 52 records a flag, which indicates that the isochronous packet was supplied from the physical layer portion 51, in a predetermined built-in register. Besides, the link layer portion 52 reads out the copyright management information indicated by the upper two bits of the synchronization code of the packet header from the isochronous packet, and judges whether copying is permitted for the received content data (judges whether the copyright management information is "Copy Free" of "Write Once"). On the basis of the judgement result, the link layer portion records a flag, which indicates whether or not copying is permitted for the content data, in a predetermined built-in register. The link layer portion 52 further outputs the isochronous packet to a digital receiver 53 in Bi phase.

The digital receiver 53 judges whether or not the phase of isochronous packet inputted from the link layer portion 52 is synchronous, and records a flag indicating the judgement result in a predetermined built-in register. The digital receiver 53 reads out the SCMS information from the isochronous packet, and judges whether or not copying is permitted for the content data on the basis of the read SCMS information. On the basis of the judgement result, the digital receiver records a flag, which indicates whether or not copying is permitted for the content data, in a predetermined built-in register.

Figure 10:
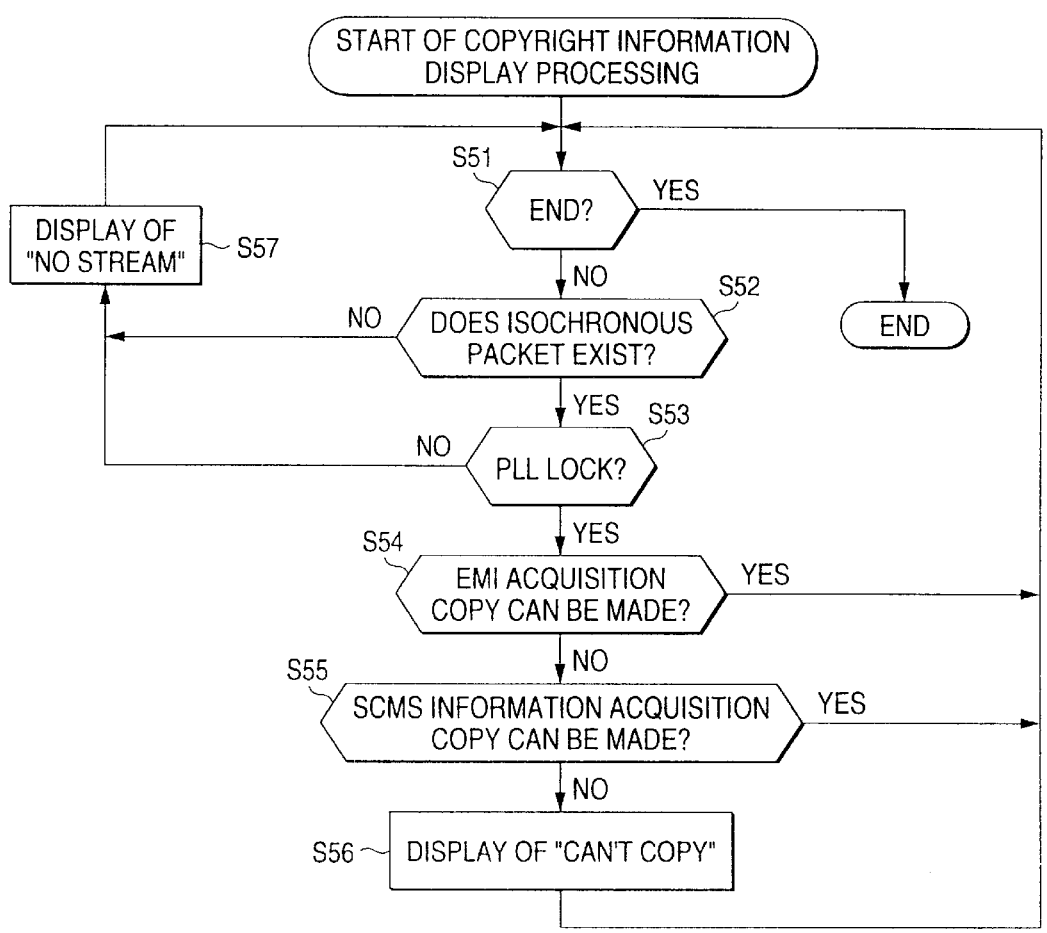
FIG. 10 is a flowchart for explaining a copyright information display processing.

Next, the operation will be described with reference to the flowchart of FIG. 10. The copyright information display processing is started in such a way that for example, when the optical disk drive 2 starts to receive the isochronous packet of audio data through the IEEE 1394 bus 1 from the set top box 3, the system controller 21 controls mainly the IEEE 1394 interface 35 on the basis of a program for copyright information display processing stored in the program ROM 38.

At step S51, the system controller 21 judges whether or not an instruction to end the reception of content data is given by a user, and in the case where it is judged that the instruction to end the reception is not given, the process proceeds to step S52. At step S52, the system controller 21 refers to the predetermined built-in register of the link layer portion 52 of the IEEE 1394 interface 35, and judges whether or not the isochronous packet is inputted to the IEEE 1394 interface 35. In the case where it is judged that the isochronous packet is inputted, the process proceeds to step S53.

At step S53, the system controller 21 refers to the predetermined built-in register of the digital receiver 53 of the IEEE 1394 interface 35, and judges whether or not the phase of the isochronous packet inputted from the link layer portion 52 is synchronous. In the case where it is judged that the phase of the isochronous packet is synchronous, the process proceeds to step S54.

At step S54, the system controller 21 refers to the flag on the basis of judgement result of the copyright management information stored in the predetermined built-in register of the link layer portion 52 of the IEEE 1394 interface 35, and judges whether or not copying of the received content data is permitted. In the case where it is judged that copying of the received content is not permitted, the process proceeds to step S55.

At step S55, the system controller 21 refers to the flag on the basis of the judgement result of the SCMS information stored in the predetermined built-in register of the digital receiver 53 of the IEEE 1394 interface 35, and judges whether or not copying of the received content data is permitted. In the case it is judged that copying of the received content is not permitted, the process proceeds to step S56.

Figure 11A:
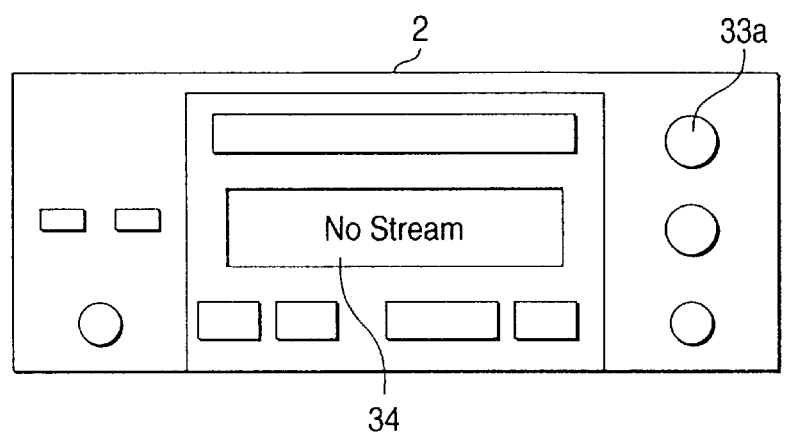
FIGS. 11A and 11B are diagrams showing display examples of copyright information.
Figure 11B:
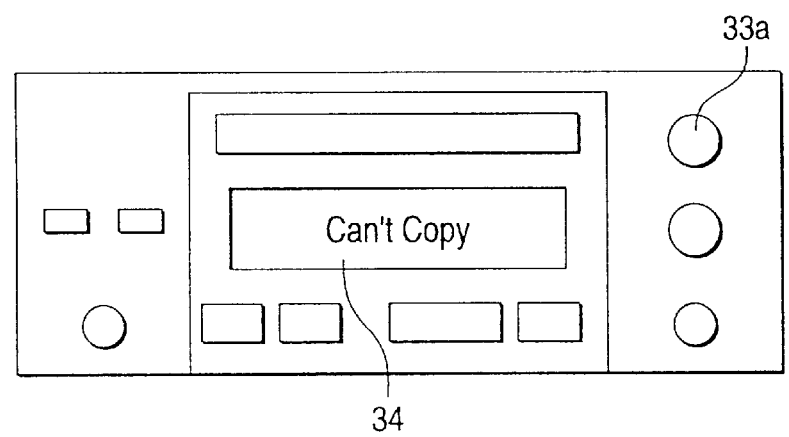

At step S56, the system controller 21, as shown in FIG. 11(B) causes the display portion 34 to indicate "Can't Copy", and notifies the user that the content data under reception can not be copied.

Thereafter, the subsequent processing is repeated until it is judged at step S51 that the instruction to end the reception of the content is given.

Incidentally, at step S52, in the case where it is judged that the isochronous packet is not inputted to the IEEE 1394 interface 35, or at step S53, in the case where it is judged that the phase of the isochronous packet is not synchronous, the process proceeds to step S57. At step S57, the system controller 21 causes the display portion 34 to indicate "No Stream" as shown in FIG. 11A, and notifies the user that content data are not received.

At step S54, in the case where it is judged that copying of the received content is permitted, or at step S55, it is judged that copying of the received content is permitted, the process returns to step S51 and the subsequent processing is repeated.

According to the foregoing copyright information display processing, it becomes possible for the user to easily recognize whether or not the content data under reception can be copied.

Incidentally, in the copyright information display processing, in the case where copying of the received content data is not permitted, the display portion is made to indicate that point. However, in the case where copying of received content is permitted, the display portion may indicate that point. The words representing four kinds of states indicated by the copyright management information, that is, "Copy Free", "Write Once", "No More Copy", or "Never Copy" may be indicated.

In the copyright information display processing, in the case where the isochronous packet does not exist, or in the case where the synchronization of phase of the isochronous packet is not taken, "No Stream" is indicated on the display portion to notify the user that content data are not accurately received. However, for example, as shown in FIGS. 3A and 3B, in the case where the authentication processing as pre-processing for receiving content data was not normally ended, for example, even in the case where authentication was not made, "No Stream" may be displayed on the display portion to notify the user that the content data can not be received.

Next, in the bus network system of the present invention, with respect to a consecutive processing where an isochronous packet of content data is encrypted at a transmission side and the encrypted isochronous packet is decrypted at a reception side, a description will be made on an example where, for example, the isochronous packet of content data is encrypted and is transmitted from the optical disk drive 2-1 to the optical disk drive 2-2 through the IEEE 1394 bus 1.

FIGS. 12 shows a structural example of portions of the optical disk drives 2-1 and 2-2 relating to the consecutive processing where the isochronous packet is encrypted and is transmitted, and is decrypted at the reception side.

A control portion 61 of the optical disk drive 2-1 as the transmission side controls a time variable generating portion 62 and an IEEE 1394 interface 35-1. The time variable generating portion 62 generates a time variable which is incremented by, for example, one every 30 seconds on the basis of the control from the control portion 61, and supplies it as an encryption key to an encrypting portion 63.

The encrypting portion 63 encrypts data, which are read out from the disk 11 by a reproducing system of the optical disk drive 2-1, by using the encryption key supplied from the time variable generating portion 62, adds a flag (ODD/EVEN flag of the third bit of the synchronization code shown in FIGS. 8A and 8B) indicating the attribute (ODD or EVEN) of the used encryption key to the obtained encrypted data, and outputs it to the IEEE 1394 interface (I/F) 35-1. The IEEE 1394 interface 35-1 records the encrypted data (with the ODD/EVEN flag) inputted from the encrypting portion 63 in a built-in FIFO buffer, and sequentially makes an isochronous packet and outputs it to the IEEE 1394 bus 1.

In response to a request from an IEEE 1394 interface (in this case, an IEEE 1394 interface 35-2 of the optical disk drive 2-2) of another electronic device connected to the IEEE 1394 bus 1, the IEEE 1394 interface 35-1 supplies a seed, which is information for generating a decryption key for decrypting content data encrypted by a next encryption key (in this case, an encryption key having the attribution of EVEN) of an encryption key (for example, its attribution is ODD) presently used for encryption (in this case, although the seed is for generating the encryption key having the attribute of EVEN, since the encryption key used at the timing when the seed is transmitted has the attribute of ODD, the attribute of the seed as information for generating the decryption key is also ODD), as an asynchronous packet, to the electronic device, that is, the optical disk 2-2 through the IEEE 1394 bus 1.

A control portion 71 of the optical disk drive 2-2 as the reception side controls a key generating portion 72 and a decrypting portion 73 in response to the ODD/EVEN flag of the isochronous packet of the encrypted content data inputted from the IEEE 1394 interface 35-2. The IEEE 1394 interface 35-2 receives an isochronous packet (hereinafter referred to as encrypted data) of encrypted data distributed to the IEEE 1394 bus 1, and outputs it to the control portion 71 and the decryption portion 73. The IEEE 1394 interface 35-2 receives the isochronous packet of the seed used for generating the decryption key through the IEEE 1394 bus 1 and outputs it to the control portion 71. This seed is supplied from the control portion 71 to the key generating portion 72.

The key generating portion 72 alternately generates a decryption key (hereinafter referred to as an ODD key) having the attribute of ODD and a decryption key (hereinafter referred to as an EVEN key) having the attribute of EVEN, in accordance with the attribute of the seed supplied from the control portion 71, and supplies it to the decrypting portion 73. Specifically, a predetermined arithmetic operation is performed to the seed supplied from the control portion 71 (for example, the seed having the attribute of ODD) and the common key obtained by the authentication processing as shown in FIGS. 3A and 3B, so that a decryption key (in this case, an EVEN key) is generated and is supplied to the decrypting portion 73. Incidentally, the details of the key generation processing of the key generating portion 72 will be described later with reference to the flowchart of FIG. 16.

The decrypting portion 73 decrypts the encrypted data by using one of the ODD key and EVEN key supplied from the key generation portion 72, which corresponds to the ODD/EVEN flag of the encrypted data inputted from the IEEE 1394 interface 35-2, and outputs the obtained content data to a later stage.

Figure 13:
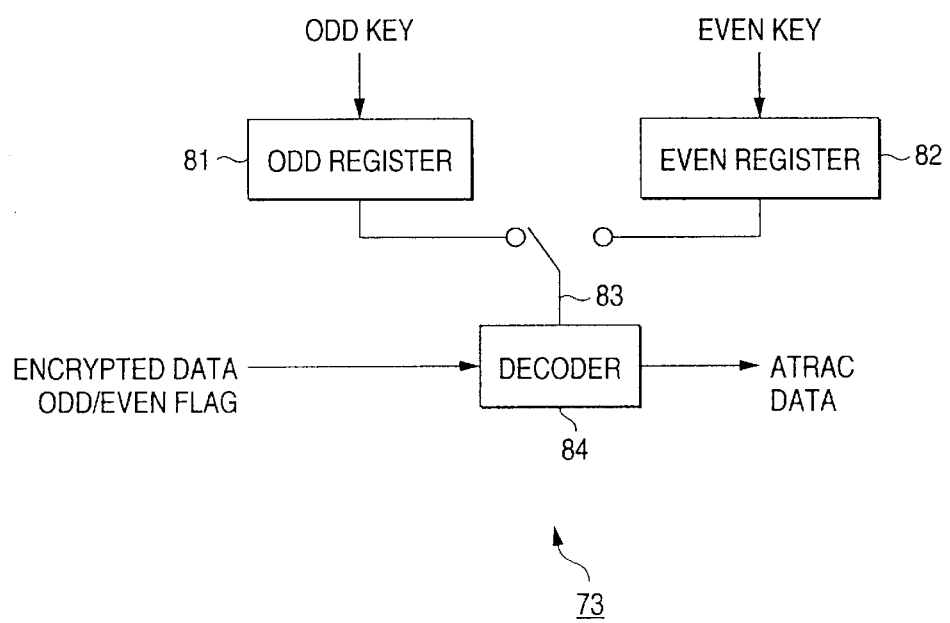
FIG. 13 is a block diagram showing a structural example of a decrypting portion 73 of FIG. 12.

FIG. 13 shows a detailed structural example of the decrypting portion of FIG. 12. As shown in FIG. 13, in the decrypting portion 73, the ODD key supplied from the key generating portion 72 is written in an ODD register 81, and the EVEN key is written in an EVEN register 82. A decoder 84 reads the ODD/EVEN flag of the encrypted data inputted from the IEEE 1394 interface 35-2 and changes a switch 83 in accordance with the read ODD/EVEN flag. Further, the decoder 84 reads out the encryption key (ODD key or EVEN key) from the ODD register 81 or the EVEN register 82, and decrypts the encrypted data by using the encryption key.

Here, a description will be made on a delay when encrypted content data are communicated as an isochronous packet and a delay when a seed used for generation of a decryption key is transmitted as an asynchronous packet.

Figure 14:
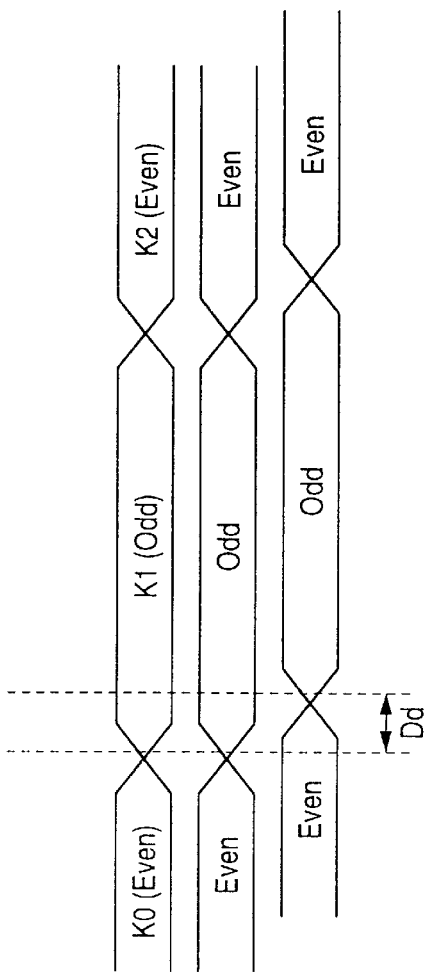
FIGS. 14A to 14C are diagrams for explaining a reception delay of content data communicated as an isochronous packet.

First, the delay when the encrypted content data are communicated as the isochronous packet will be described with reference to FIGS. 14A to 14C. At the transmission side, for example, in the case where the time variable generating portion 62 sequentially renews a time variable (encryption key) as K0, K1, and K2 at the timing as shown in FIG. 14A, an ODD/EVEN flag added to encrypted data outputted from the encrypting portion 63 is changed at the same timing as the time variable as shown in FIG. 14B. On the contrary, at the reception side, the encrypted data is received by the IEEE 1394 interface 35-2 of the optical disk drive 2-2 through the IEEE 1394 bus 1, and the timing when it is supplied to the decrypting portion 73 is delayed by a time Dd from the transmitted time, for example, due to the crowded state or the like of the communication band of the IEEE 1394 bus 1 as shown in FIG. 14C.

Next, the delay when the seed used for generation of the decryption key is transmitted as the asynchronous packet will be described with reference to FIGS. 15A to 15E. With respect to timing tr, at the transmission side, when the seed having the same attribute as the attribute (ODD or EVEN) of the encryption key presently used for encryption of content data is transmitted as the isochronous packet on the basis of the request from the reception side, timing tr when the ODD key or EVEN key for decryption is generated on the basis of the seed at the reception side and is supplied to the decrypting portion 73 is delayed as shown in either one of two kinds of states shown in FIGS. 15D and 15E due to, for example, the processing in the IEEE 1394 interface 35-2 and the key generating portion 72 or the crowded state or the like of the communication band of the IEEE 1394 bus 1.

Figure 15:
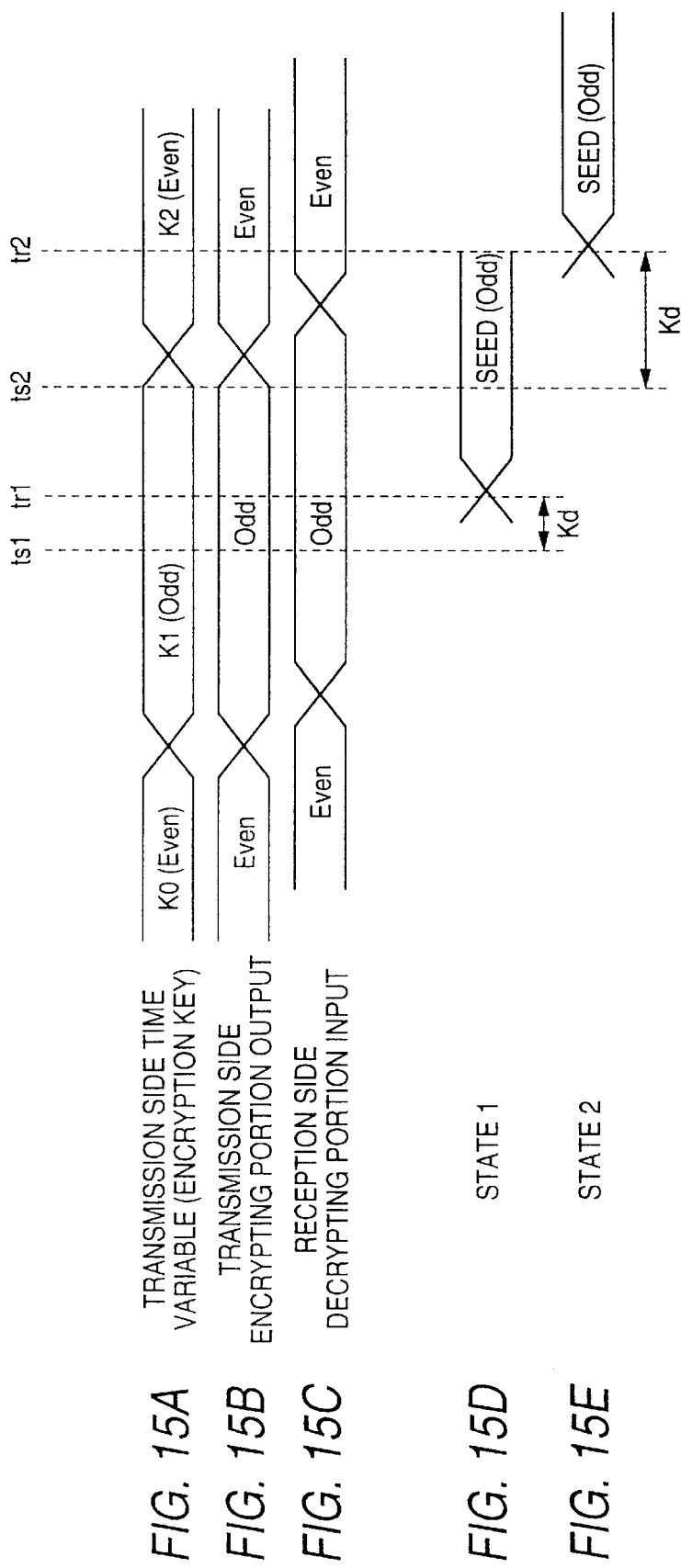
FIGS. 15A to 15E are diagrams for explaining a reception delay of a seed communicated as an isochronous packet.

That is, the state 1 shown in FIG. 15D is a state where the attribute (ODD) of content data received as the isochronous packet is coincident with the attribute (ODD) of the seed received as the isochronous packet. The state 2 shown in FIG. 15E is a state in which the attribute (EVEN) of the content data received as the isochronous packet is different from the attribute (ODD) of the seed received as the isochronous packet.

In the case of the state 1 shown in FIG. 15D, if the decryption key having the attribute of EVEN is generated using the seed having the attribute of ODD, it is possible to decrypt content data encrypted by an encryption key K2 (its attribute is EVEN) received thereafter. On the contrary, in the case of the state 2 shown in FIG. 15E, if the decryption key having the attribute of EVEN is generated by using the seed having the attribute of ODD, it becomes impossible to decrypt content data encrypted by an encryption key K3 (its attribute is ODD) received thereafter.

Figure 16:
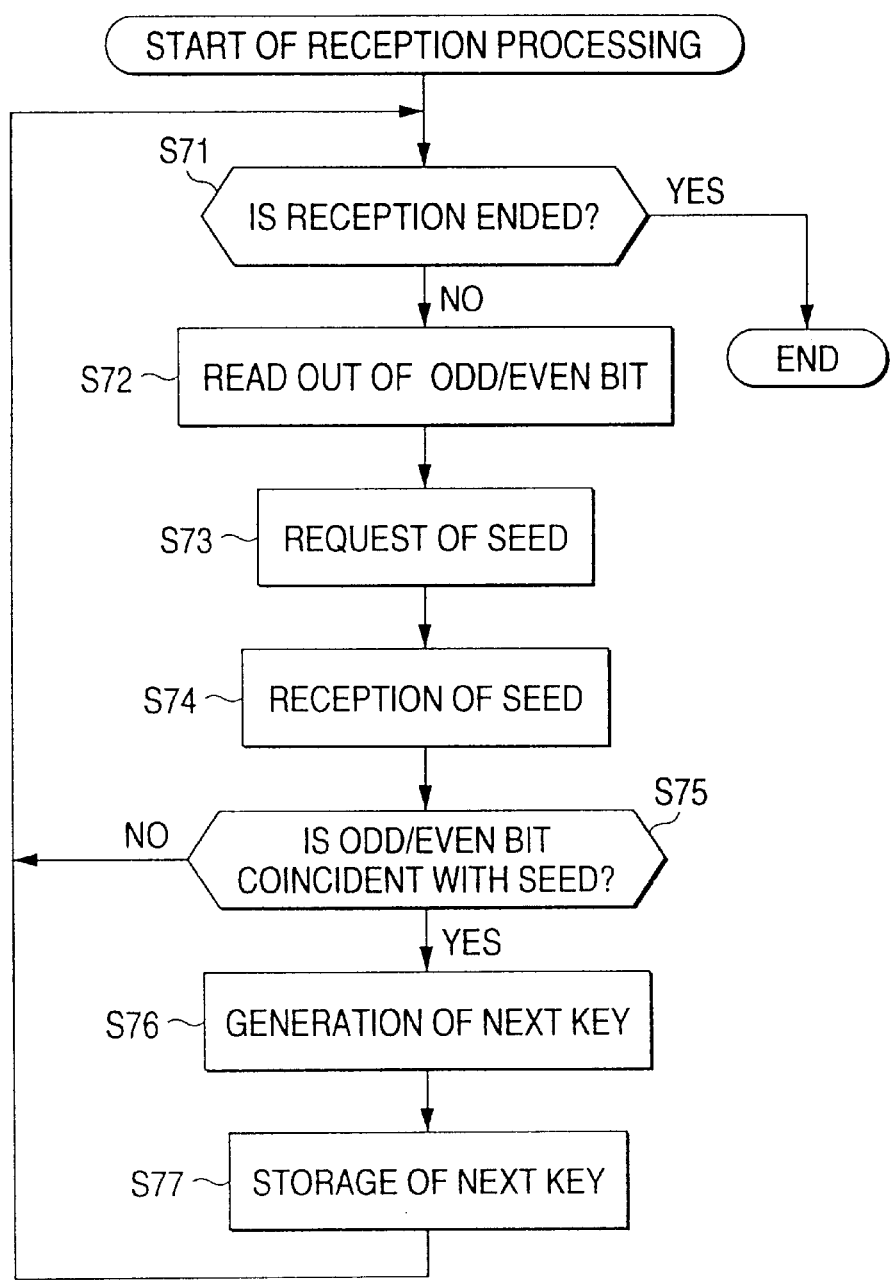
FIG. 16 is a flowchart for explaining a key generation processing.

With reference to the flowchart of FIG. 16, a description will be made on a key generation processing which operates not to generate a decryption key using a seed in the case where the attribute of the seed and the attribute of encrypted data are different from each other, so that the foregoing disadvantage is not caused. The key generation processing is started when the optical disk drive 2-2 receives the encrypted data through the IEEE 1394 bus 1.

At step S71, the control portion 71 judges whether or not the reception of the encrypted data is ended, and in the case where it is judged that the reception is not ended, the process proceeds to step S72. At step S72, the step control portion 71 reads out the ODD/EVEN flag of the encrypted data inputted from the IEEE 1394 interface 35-2.

At step S73, on the basis of the control from the control portion 71, the IEEE 1394 interface 35-2 requests transmission of the seed to the IEEE 1394 interface 35-1 of the optical disk 2-1 through the IEEE 1394 bus 1. In response to this request, the IEEE 1394 interface 35-1 of the optical disk drive 2-1 transmits, as an isochronous packet, the seed having the attribute equal to the attribute of the encryption key presently used for encryption of the content data.

At step S74, the isochronous packet of the seed transmitted from the IEEE 1394 interface 35-1 is received by the IEEE 1394 interface 35-2 of the optical disk drive 2-2, and is supplied to the control portion 71. At step S75, the control portion 71 judges whether or not the attribute of the ODD/EVEN flag of the encrypted data read at step S72 is coincident with the attribute of the seed received at step S74, and in the case where it is judged that they are coincident with each other, the process proceeds to step S76.

Figure 3A:
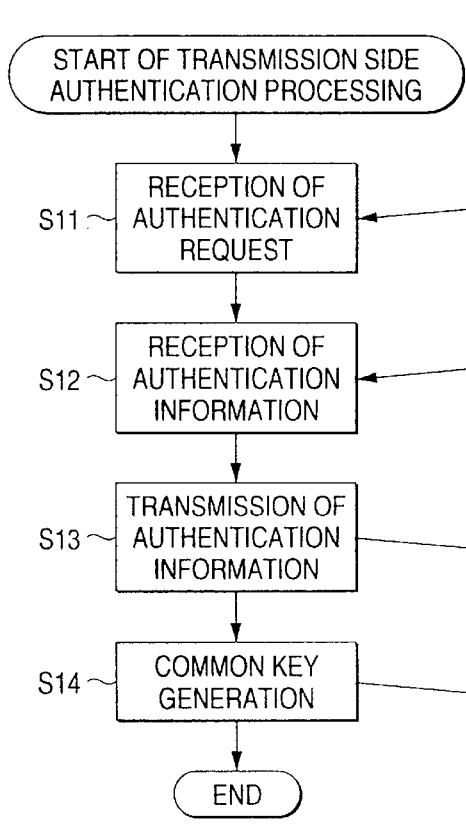
FIGS. 3A and 3B are flowcharts for explaining an authentication processing.
Figure 3B:
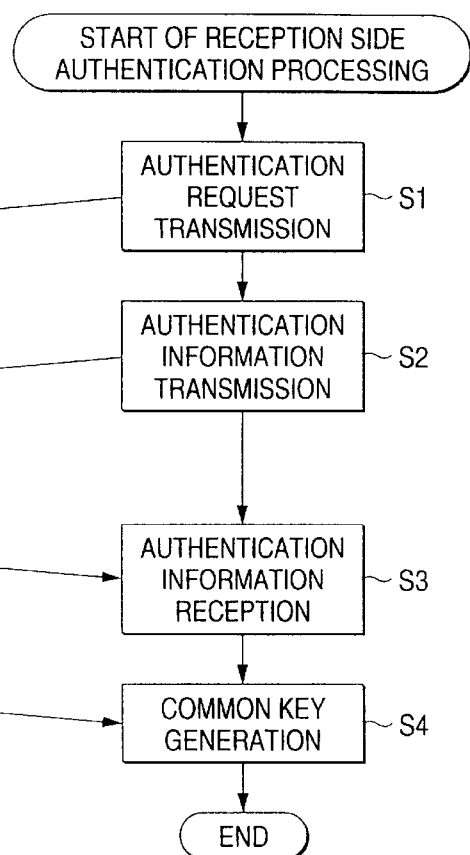

At step S76, the key generating portion 72 performs a predetermined arithmetic operation to the seed supplied from the control portion 71 and the common key obtained by the authentication processing shown in FIGS. 3A and 3B, so that a decryption key having the attribute different from the attribute of the seed is generated and is supplied to the decrypting portion 73. At step S77, the decrypting portion 73 records the decryption key supplied from the key generating portion 72 in the ODD register 81 or the EVEN register 82 in accordance with the attribute.

Incidentally, at step S75, in the case where it is judged that the attribute of the ODD/EVEN flag of the encrypted data read out at step S72 is not coincident with the attribute of the seed supplied at step S74, the process returns to step A71. Thus, at this time, a next decryption key is not generated.

However, until it is judged that the reception of the encrypted data is ended, the processing subsequent to step S71 is periodically repeated. Thus, at step S75 subsequent to the next time, it is judged that the attribute of the ODD/EVEN flag of the encrypted data read out at step S72 is coincident with the attribute of the seed supplied at step S74, and a decryption key is sequentially generated.

As described above, the attribute of the seed is compared with the attribute of the encrypted data, and the decryption key is generated in accordance with the result, so that it becomes possible to normally decrypt the encrypted data.

Incidentally, as described above, in the embodiment, the description has been made on the example in which the present invention is mainly applied to the optical disk drive. However, the present invention can also be applied to the set top box 3, the personal computer 4, and other electronic devices respectively equipped with the IEEE 1394 interface.

Although the foregoing consecutive processing can be executed by hardware, it can also be executed by software. In the case where the consecutive processing is executed by software, a program constituting the software is installed in a computer, for example, the system controller 21 shown in FIG. 2, incorporated in the optical disk drive 2 as dedicated hardware, or is installed in a general-purpose personal computer capable of executing various functions by installing various programs.

Next, with reference to FIGS. 17A to 17C, with respect to a medium used for installing a program to execute the foregoing consecutive processing into a computer and making it executable by the computer, a description will be made on a case, as an example, where the computer is a general-purpose personal computer.

Figure 17A:
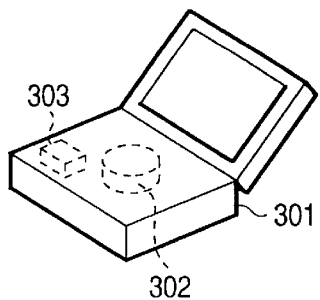
FIGS. 17A to 17C are diagrams for explaining media respectively used for installing a program in a personal computer 301 and making it executable.

As shown in FIG. 17A, a program in a state where it is previously installed in a hard disk 302 as a built-in recording medium of a personal computer 301 or in a semiconductor memory 303 (corresponding to the program RAM 38 shown in FIG. 2), can be provided to a user.

Figure 17B:
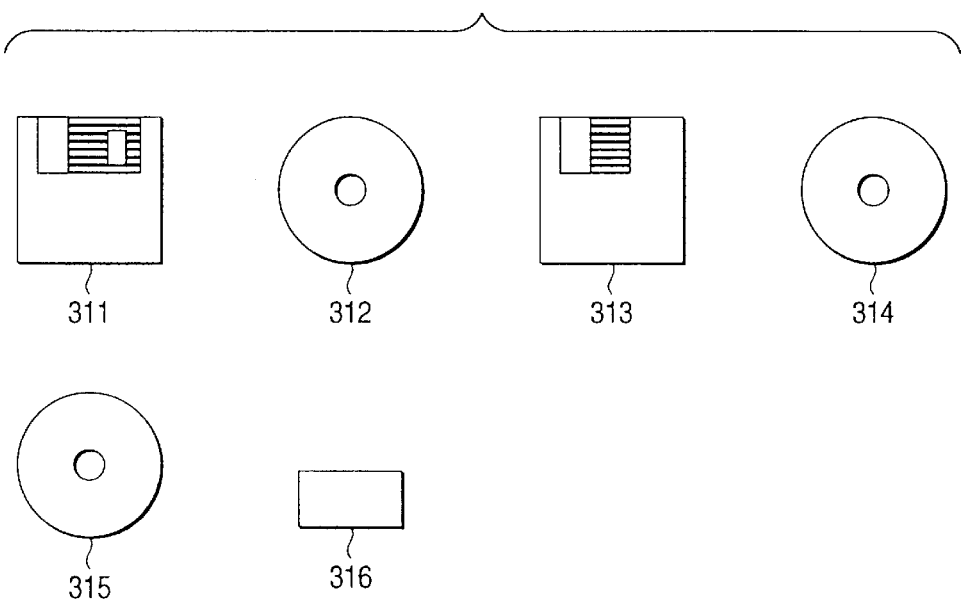

Alternatively, as shown in FIG. 17B, a program is temporarily or permanently stored in a recording medium, such as a floppy disk 311, a CD-ROM (Compact Disc-Read Only Memory) 312, a MO (Magneto-Optical) disk 313, a DVD (Digital Versatile Disc) 314, a magnetic disk 315, or a semiconductor memory 316, and can be provided as package software.

Figure 17C:
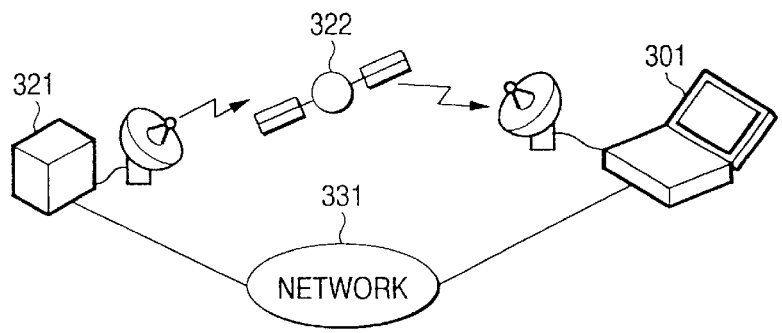

Moreover, as shown in FIG. 17C, a program is transmitted from a download site 321 through a satellite 322 by wireless to a personal computer 301, or is transmitted to the personal computer 301 through a network 331, such as a local area network or the Internet, by wire or wireless, and can be stored in a built-in hard disk 302 or the like in the personal computer 301.

The term "medium" in the present specification means a wide conception containing all these media.

Figure 18:
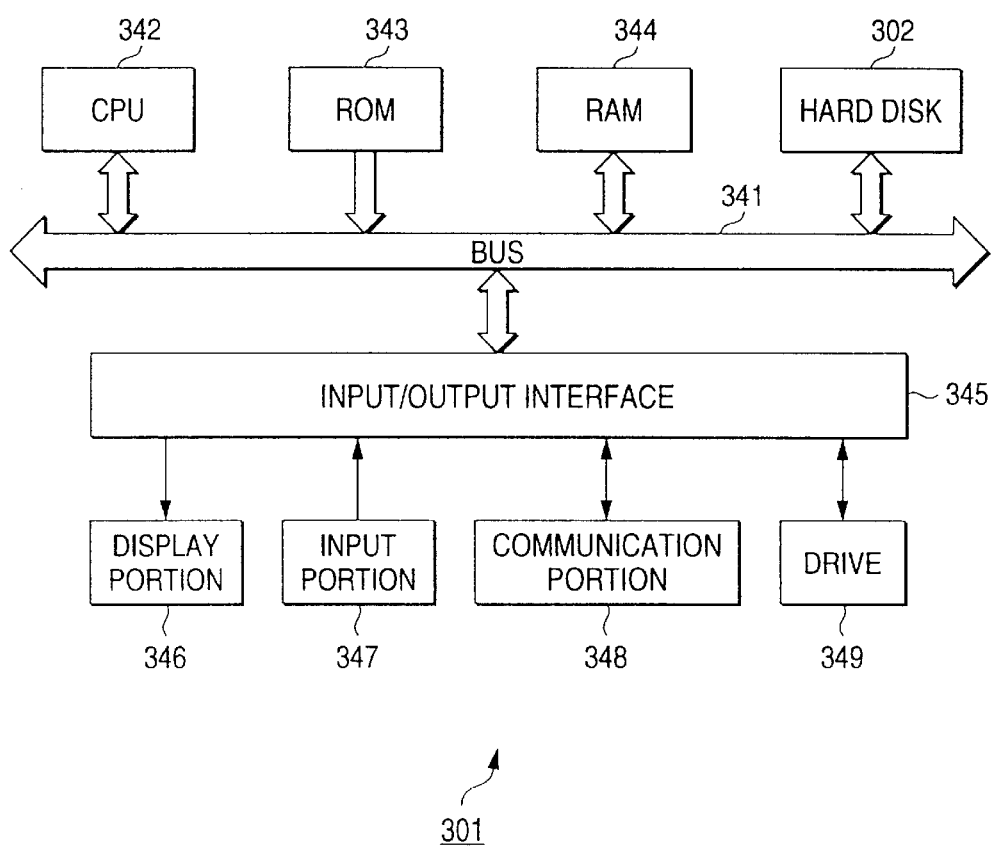
FIG. 18 is a diagram for explaining a personal computer 301.

The personal computer 301 has, for example, a built-in CPU (Central Processing Unit) 342 as shown in FIG. 18. The CPU 342 is connected with an input/output interface 345 through a bus 341. When an instruction is inputted by a user from an input portion 347 made of a key board, a mouse and the like through the input/output interface 345, in response to that, the CPU 342 loads a program stored in a ROM (Read Only Memory) 343 corresponding to the semiconductor memory 303 of FIG. 17A, a program which was transmitted from the satellite 322 or the network 331, was received in a communication portion 348, and was installed in the hard disk 302, or a program which was read out from the floppy disk 311, CD-ROM 312, MO disk 313, DVD 314, or magnetic disk 315 mounted to a drive 349 and was installed in the hard disk 302, into a RAM (Random Access Memory) 344 and executes it. Further, the CPU 342 outputs the processing result through the input/output interface 345 to a display portion 346 made of, for example, a LCD (Liquid Crystal Display) or the like as needed.

Incidentally, in the present specification, steps for describing the program provided by the medium include a processing performed in time series in accordance with the recited sequence, and also include a processing which is not necessarily performed in time series but is executed in parallel or separately.

In the present specification, the term "system" indicates the whole of an apparatus constructed by a plurality of devices.

What is claimed is:

1. An electronic device that is connected to a plurality of other electronic devices through a bus and performs data communication with the plurality of other electronic devices through the bus, the electronic device comprising:

a storage portion;

an interface portion connected to the bus; and a control portion for controlling the storage portion and the interface portion, whereby the control portion controls the interface portion to obtain identification codes of the plurality of other electronic devices connected through the bus, further controls the interface portion to obtain intrinsic information from a communication partner electronic device from among the plurality of other electronic devices connected through the bus, associates the obtained intrinsic information with the identification code of the communication partner electronic device, stores the obtained intrinsic information in the storage portion, and when the identification code of the communication partner electronic device is changed, the control portion renews the intrinsic information of the communication partner electronic device stored in the storage portion based upon the changed identification code, wherein the bus is an IEEE 1394 bus;

in at least one of a time when bus reset occurs and when power is supplied to the electronic device, the control portion obtains intrinsic information from each of the plurality of other electronic devices connected to the bus and compares the obtained intrinsic information of the respective other electronic devices with the intrinsic information stored in the storage portion; and as a result of comparing the obtained intrinsic information of the respective other electronic devices with the intrinsic information stored in the storage portion, the control portion:

communicates with the other electronic device having obtained intrinsic information coincident with the intrinsic information stored in the storage portion from among the plurality of other electronic devices;

obtains an identification code and the intrinsic information of a new communication partner electronic device from among the plurality of other electronic devices by controlling the interface portion, stores the obtained identification code and intrinsic information of the new communication partner electronic device in the storage portion, and causes a display portion to show an indication to urge a user to select a new communication object device when any of the obtained intrinsic information of the respective other electronic devices is not coincident with the intrinsic information stored in the storage portion.

2. The electronic device according to claim 1, wherein the identification code is a node ID and the intrinsic information is a node unique ID.

3. A data communication method utilizing an electronic device that is connected to a plurality of other electronic devices through a bus and performs data communication with the plurality of other electronic devices through the bus, comprising the steps of:

obtaining identification codes of the plurality of other electronic devices connected through the bus;

obtaining intrinsic information from a communication partner electronic device from among the plurality of other electronic devices connected through the bus;

associating the obtained intrinsic information with the identification code of the communication partner electronic device and storing the obtained intrinsic information; and renewing, when the identification code of the communication partner electronic device is changed, the stored intrinsic information of the communication partner electronic device based upon the changed identification code, wherein the bus is an IEEE 1394 bus;

in at least one of a time when bus reset occurs and when power is supplied to the electronic device, intrinsic information is obtained from the each of plurality of other electronic devices connected to the bus and the obtained intrinsic information of the plurality of other electronic devices is compared with the stored intrinsic information; and as a result of comparing the obtained intrinsic information of the respective devices with the stored intrinsic information:

the electronic device communicates with the other electronic device having obtained intrinsic information coincident with the stored intrinsic information from among the plurality of other electronic devices; and an identification code and the intrinsic information of a new communication partner electronic device from among the plurality of other electronic devices is obtained by controlling an interface portion, the obtained identification code and intrinsic information of the new communication partner electronic device is stored, and an indication is displayed on a display portion to urge a user to select a new communication object device when any of the obtained intrinsic information of the respective other electronic devices is not coincident with the stored intrinsic information.

4. The data communication method according to claim 3, wherein the identification code is a node ID and the intrinsic information is a node unique ID.

5. A data communication method in which a plurality of electronic devices are connected to each other through a bus, and data communication is performed among the plurality of electronic devices through the bus, comprising the steps of:

obtaining, in an electronic device from among the plurality of electronic devices, identification codes of the other electronic devices of the plurality of electronic devices connected through the bus;

obtaining, in the electronic device, intrinsic information from a communication partner electronic device from among the plurality of other electronic devices connected through the bus;

causing, in the electronic device, the obtained intrinsic information to be associated with the identification code of the communication partner electronic device and to be stored; and renewing, in the electronic device, when the identification code of the communication partner electronic device is changed, the stored intrinsic information of the communication partner electronic device based upon the changed identification code, wherein the bus is an IEEE 1394 bus;

in at least one of a time when bus reset occurs and when power is supplied to the electronic device, intrinsic information is obtained from the remaining electronic devices respectively among the plurality of electronic devices connected to the bus and the obtained intrinsic information of the plurality of other devices is compared with the stored intrinsic information; and as a result of comparing the obtained intrinsic information of the plurality of other devices with the stored intrinsic information:

the electronic device communicates with the other electronic device having obtained intrinsic information coincident with the stored intrinsic information from among the plurality of other electronic devices; and an identification code and the intrinsic information of a new communication partner electronic device from among the plurality of other electronic devices is obtained by controlling an interface portion, the obtained identification code and intrinsic information of the new communication partner electronic device is stored, and an indication is displayed on a display portion to urge a user to select a new communication object device when any of the obtained intrinsic information of the respective other electronic devices is not coincident with the stored intrinsic information.

6. The data communication method according to claim 5, wherein the identification code is a node ID and the intrinsic information is a node unique ID.

* * * * *